United States Patent Office 3,013,722
Patented Dec. 19, 1961

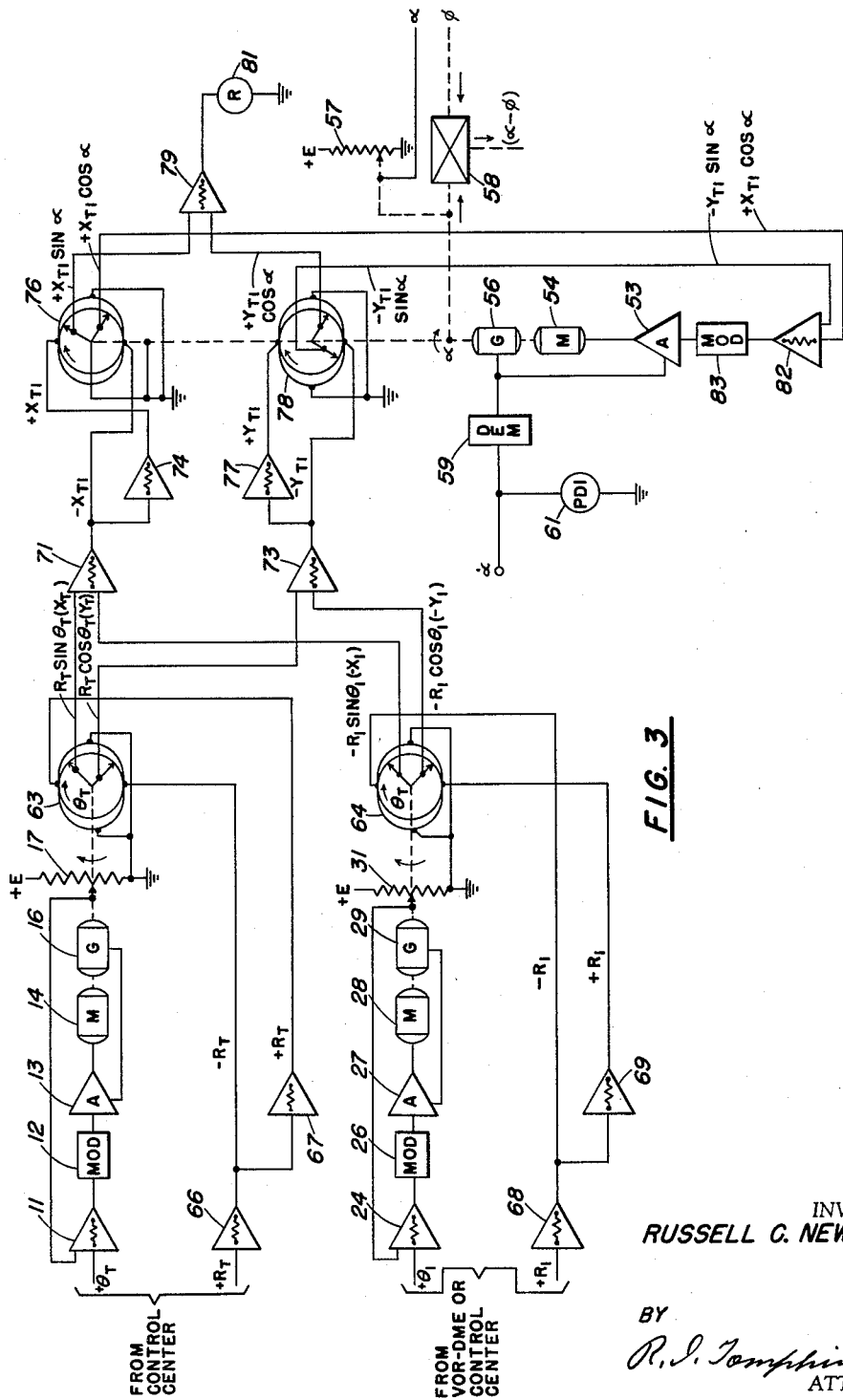

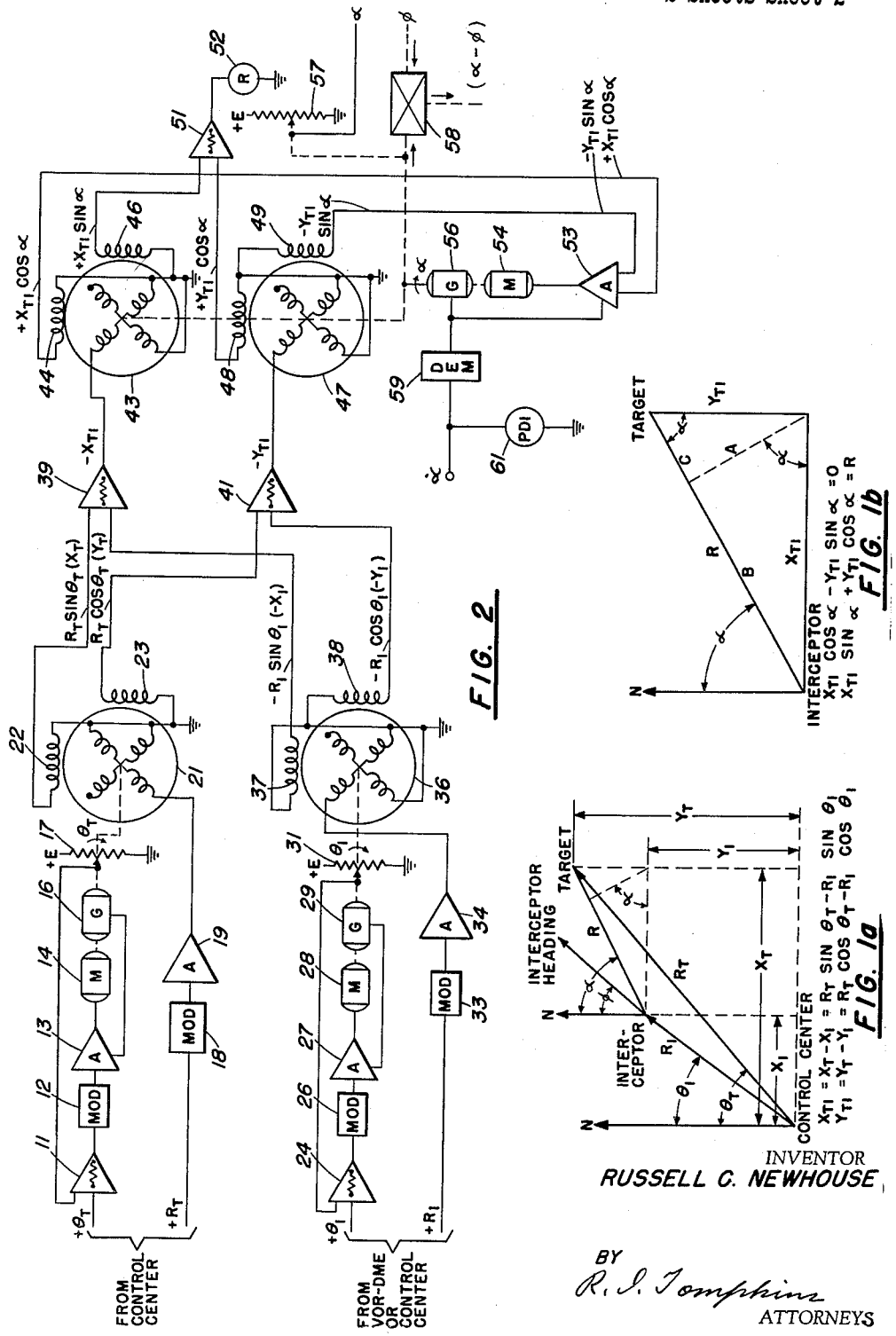

3,013,722
PROPORTIONAL NAVIGATION COMPUTER
Russell C. Newhouse, Short Hills, N.J., assignor, by mesne assignments, to the United States of America as represented by the Secretary of the Navy
Filed Jan. 18, 1957, Ser. No. 635,078
6 Claims. (Cl. 235—181)

The present invention relates to a navigation computer and more particularly to a proportional navigation computer for directing the course of an interceptor, determining the line of sight between the interceptor and a target (target bearing), and determining the angular difference between the target bearing and the interceptor heading during the vectoring phase of a target interception.

The term vectoring phase is used to denote that period between the time an interceptor aircraft has left an airfield or the flight deck of an aircraft carrier and the time the AI (Aircraft Interception) radar has locked on the target. During this phase, the interceptor is directed, i.e. vectored, to intercept the target in accordance with the positions of the target and the interceptor with respect to a control center for example, a control aircraft, a ship, or a shore station. Vectoring of interceptors is necessary at the present time because there are available no adequate long range AI radar systems.

The position of the target may be determined by air search radars under the direction of the interception control center or by airborne early warning radar. The position of the interceptor may be determined either by the same radar means utilized to determine the target position or by a navigation aid located in the interceptor aircraft, for example, OMNI-RANGE-DME.

The course followed by the interceptor to the tally-ho position i.e., the point of lock on by the AI radar, may be either a predicted collision course or a proportional navigation course. In the collision course the interceptor is directed to assume a straight line course which will bring it into collision with the target at some future position, assuming that the bomber (target) continues with constant velocity. In the proportional navigation course, the interceptor assumes a rate of turn that is proportional to the rate of change of the line of sight from the interceptor to the target.

The present invention relates to a proportional navigation vectoring computer. A collision course computer is described in co-pending application Serial No. 678,749, filed August 16, 1957, for Collision Course Computer.

While collision course computers have certain advantages, fully set forth in the above referenced copending application, there are several advantages inherent in a proportional navigation system. For example, in such a system the line of sight between the interceptor and the target is continuously determined thereby permitting continuous training of the AI radar antenna in the direction of the target to facilitate ultimate lock on. Further, since the ground track of the interceptor in a proportional navigation course is determined by the rate of change of the interceptor heading and not by the absolute value thereof, there is no need to correct for wind and compass errors.

Accordingly, it is an object of the present invention to provide a navigation computer to vector an interceptor to a tally-ho position.

It is another object of the present invention to provide a navigation computer to vector an interceptor aircraft to a tally-ho position that does not require correction for wind and compass errors.

It is a further object of the present invention to provide a navigation computer to vector an interceptor aircraft to a tally-ho position in accordance with the rate of change of the line of sight between the interceptor and the target.

It is still a further object of the present invention to provide a navigation computer of the character described which provides an output whereby the AI radar antenna may be continuously trained upon the target and the target direction may be indicated on the AI radar display.

Further objects and many of the attendant advantages of the present invention will be readily appreciated as the same becomes better understood by reference to the following detailed description when considered in connection with the accompanying drawings wherein:

FIGS. 1a and 1b are diagrams which illustrate the geometry of the problem and set forth the equations which are mechanized by the computer.

FIG. 2 illustrates an embodiment of the invention employing A.C. computing.

FIG. 3 illustrates another embodiment of the invention employing D.C. computing.

Referring now to FIG. 1a, it may be seen that the positions of the target and the interceptor with respect to the control center and the position of the target with respect to the interceptor may respectively be expressed in polar co-ordinates as:

(1) $R_T \,/\, \theta_T$
(2) $R_I \,/\, \theta_I$
(3) $R \,/\, \alpha$ where $\theta_T$, $\theta_I$, and $\alpha$ are measured with respect to an arbitrarily chosen reference direction, for example, true north. The angle $\alpha$ is the angle of the line of sight between the interceptor and the target and R is the target range.

The positions of the target and the interceptor with respect to the control center may be expressed in rectangular co-ordinates as:

(4) $\qquad X_T = R_T \sin \theta_T$
(5) $\qquad Y_T = R_T \cos \theta_T$
(6) $\qquad X_I = R_I \sin \theta_I$
(7) $\qquad Y_I = R_I \cos \theta_I$ The position of the target with respect to the interceptor may be determined and expressed in rectangular co-ordinates by subtracting Equation 6 from Equation 4 and Equation 7 from Equation 5:

(8) $\qquad X_{TI} = R_T \sin \theta_T - R_I \sin \theta_I$
(9) $\qquad Y_{TI} = R_T \cos \theta_T - R_I \cos \theta_I$ It will be noted that the angle between the interceptor heading, $\phi$, and the target may be expressed as $\alpha - \phi$. The interceptor's AI radar antenna may be trained to this angle to facilitate lock-on. A signal proportional to this angle may also be utilized to designate the target direction on the AI radar display.

Referring now to FIG. 1b, two equations will be derived which are mechanized by the computer to determine R and $\alpha$.

(10) $\qquad A = X_{TI} \cos \alpha = Y_{TI} \sin \alpha$
(11) $\qquad R = B + C$
(12) $\qquad B = X_{TI} \sin \alpha$
(13) $\qquad C = Y_{TI} \cos \alpha$ From Equation 10:

(14) $\qquad X_{TI} \cos \alpha - Y_{TI} \sin \alpha = 0$

From Equations 11, 12, and 13:

(15) $\qquad R = X_{TI} \sin \alpha + Y_{TI} \cos \alpha$

It is assumed that the target and interceptor positions, expressed in polar co-ordinates, will be available as D.C. input voltages for the computer. The position voltages will be corrected periodically in accordance with data supplied intermittently from the target and interceptor location determining means. Systems for providing this data in the form required are well known and will not be described.

Referring now generally to FIGS. 2 and 3, it may be seen that the computer comprises a two-channel co-ordinate conversion system for respectively converting the positions of the target and the interceptor with respect to the control center from polar co-ordinates to rectangular co-ordinates, a pair of summing amplifiers connected to the co-ordinate conversion systems from which the target position with respect to the interceptor may be obtained in rectangular co-ordinates, and a system comprising a pair of synchro-resolvers or a pair of sine-cosine potentiometers and a servo loop for mechanizing Equations 14 and 15 to provide a shaft (and signal) output proportional to $\alpha$, a signal output proportional to the rate of change of $\alpha$, a summing amplifier to provide a signal output proportional to R and a differential gear to provide a shaft output proportional to the difference between the target bearing and the interceptor heading ($\alpha - \phi$).

Referring now more particular to FIG. 2 there is shown a target channel co-ordinate conversion system comprising a high-gain D.C. amplifier 11 provided with large negative feedback to reduce the gain thereof approximately to unity, a modulator 12 coupled to the output of amplifier 11, a servo amplifier 13 coupled to the modulator 12, a two-phase motor tachometer-generator set 14, 16 driven by servo amplifier 13, a potentiometer 17 having the wiper thereof positioned by the shaft of generator 16, a modulator 18, an amplifier 19 coupled to modulator 18, and a synchro resolver 21 having the rotor thereof positioned by the shaft of generator 16 and the rotor windings thereof energized by the output of amplifier 19. Synchro resolver 21 is provided with a pair of ninety-degree phase displaced stator windings 22, 23. The input to amplifier 11 comprises a D.C. voltage proportional to $\theta_T$. Modulator 12 converts the output of amplifier 11 to an alternating voltage having the same frequency as the excitation voltages of motor 14 and generator 16. Two feedback loops are provided in the system. The A.C. electrical output of tachometer generator 16 is fed back to stabilize the operation of the servo amplifier motor tachometer-generator system. The D.C. voltage at the wiper arm of potentiometer 17, which is proportional to the instantaneous value of $\theta_T$, is fed back to amplifier 11 to stabilize the operation of the servo loop. Modulator 18 and amplifier 19 convert a D.C. voltage proportional to $R_T$ to an alternating voltage of appropriate magnitude and frequency to thereby apply to the rotor windings of synchro-resolver 21 an A.C. voltage proportional to $R_T$. The rotor of synchro-resolver 21, being mechanically coupled to tachometer generator 16, is angularly positioned in accordance with the instantaneous value of $\theta_T$. Accordingly, voltages are generated in windings 22 and 23 which are proportional respectively to $X_T$ and $Y_T$ in accordance with Equations 4 and 5.

The interceptor channel co-ordinate conversion system is substantially identical to the target channel co-ordinate conversion system and comprises D.C. amplifier 24, modulator 26, servo amplifier 27, motor tachometer-generator set 28, 29, potentiometer 31, modulator 33, amplifier 34, and synchro-resolver 36 having stator windings 37, 38. Voltages are generated in windings 37, 38 which are proportional to $-X_I$ and $-Y_I$, respectively, in accordance with Equations 6 and 7. The negative signs are obtained by the electrical connection of the windings of synchro-resolver 36 and are required to implement the solution of Equations 8 and 9.

Windings 22 and 37 are coupled to the input circuit of a summing amplifier 39 which provides an output voltage proportional to $-X_{TI}$ in accordance with Equation 8. The negative sign is occasioned by phase inversion in amplifier 39.

In like manner, windings 23, 38 are coupled to the input circuit of summing amplifier 41 which provides an output voltage proportional to $-Y_{TI}$ in accordance with Equation 9.

The output voltage of amplifier 39 is coupled to the rotor windings of synchro-resolver 43 having a pair of ninety-degree phase displaced stator windings 44, 46, while the output voltage of amplifier 41 is coupled to the rotor windings of synchro-resolver 47 having a pair of ninety degree phase displaced stator windings 48, 49. The rotors of synchro-resolvers 43, 47 are mechanically interconnected and coupled to the shaft of a tachometer-generator 56 to be conjointly positioned in accordance with the angle $\alpha$ in a manner to be described below. Voltages are generated in windings 44, 46 respectively proportional to $X_{TI} \cos \alpha$ and $X_{TI} \sin \alpha$ while voltages are generated in windings 48, 49 respectively proportional to $Y_{TI} \cos \alpha$ and $-Y_{TI} \sin \alpha$.

Windings 44 and 49 are coupled to the input circuit of servo amplifier 53 the output of which will reduce to zero when Equation 14 is satisfied. The output of amplifier 53 drives motor tachometer-generator set 55, 56 to thereby provide a shaft output proportional to the instantaneous value of $\alpha$ and an electrical output proportional to the rate of change thereof. Since the shaft of generator 56 is mechanically coupled to synchro-resolvers 43, 47, as stated above, the rotors thereof will be rotated to an angular position proportional to $\alpha$.

A potentiometer 57 having the wiper thereof coupled to the shaft of generator 56 may be provided to convert the shaft output of generator 56 to an electrical output for metering or other control purposes.

The shaft output of generator 56 is further coupled to a differential gear 58 to which is further applied a shaft input proportional to $\phi$, the interceptor heading. The shaft output of differential gear 58 is therefore proportional to $\alpha - \phi$, the angle between the target bearing and the interceptor heading. This shaft output may be utilized to actuate the aircraft AI radar antenna or for other control purposes.

The electrical output of tachometer-generator 56, in addition to being fed back to amplifier 53 to stabilize the servo loop, is coupled to a demodulator 59 to provide a D.C. voltage proportional to the rate of change of $\alpha$ which may be utilized to provide a visible indication on the pilot's direction indicator 61 and to provide control signals to the interceptor aircraft's autopilot.

Windings 44 and 48 are coupled to the input circuit of summing amplifier 51 which provides an output voltage that is proportional to target range in accordance with Equation 15. The output of amplifier 51 may be coupled, for example, to an indicator 52 or to the AI radar system.

FIG. 3, which represents an embodiment of the invention employing D.C. computing, is generally similar to the embodiment shown in FIG. 2 and described above. Corresponding parts are indicated by the same reference numerals.

Synchro-resolver 22 has been replaced by a sine-cosine potentiometer 63 and synchro-resolver 37 by sine-cosine potentiometer 64. Modulator 18, amplifier 19, modulator 33, and amplifier 34 have been replaced by D.C. amplifiers 66, 67, 68, and 69. Sine-cosine potentiometer 63 provides two D.C. output voltages proportional to $X_T$ and $Y_T$, respectively, while sine-cosine potentiometer 64 provides two output voltages respectively proportional to $-X_I$ and $-Y_I$.

The output voltages of sine-cosine potentiometers 63, 64 proportional to $X_T$ and $-X_I$, are applied to a D.C. amplifier 71 to provide a direct output voltage proportional to $-X_{TI}$, while the output voltages of sine-cosine potentiometers 63, 64 proportional to $Y_T$ and $-Y_I$ are applied to D.C. amplifier 73 to provide a D.C. output voltage proportional to $-Y_{TI}$.

The output of amplifier 71 is applied directly and through a D.C. amplifier 74 to sine-cosine potentiometer 76 which provides a pair of output voltages respectively proportional to $X_{TT}$ sine $\alpha$ and $X_{TT}$ cosine $\alpha$, while the output of amplifier 73 is applied directly and through a D.C. amplifier 77 to a sine-cosine potentiometer 78 to provide a pair of output voltages proportional to $Y_{TT}$ cosine $\alpha$ and $-Y_{TT}$ sine $\alpha$.

The output voltages of sine-cosine potentiometer 76, 78 proportional to $X_{TT}$ sine $\alpha$ and $Y_{TT}$ cosine $\alpha$ are coupled to D.C. amplifier 79 to provide a D.C. output voltage proportional to range in accordance with Equation 15 which may be applied to a D.C. indicating instrument 81.

The $X_{TT}$ cosine $\alpha$ and $-Y_{TT}$ sine $\alpha$ output from sine-cosine potentiometers 76, 78 are coupled to a D.C. amplifier 82 the output of which is coupled to a modulator 83 which converts the D.C. output voltage of amplifier 82 to an alternating voltage of appropriate frequency, for application to the angle rate servo loop system described above in connection with FIG. 2. The remainder of the system, not specifically described, is similar to and operates in a manner similar to the corresponding portions of the system of FIG. 2.

Obviously many modifications and variations of the present invention are possible in the light of the above teachings. It is therefore to be understood that within the scope of the appended claims the invention may be practiced otherwise than as specifically described.

What is claimed is:

1. A proportional navigation computer comprising: first co-ordinate conversion means to convert signals proportional to the polar co-ordinates of a target with respect to a reference direction and a reference point to signals proportional to the rectangular co-ordinates thereof; second co-ordinate conversion means to convert signals proportional to the polar co-ordinates of an interceptor with respect to said reference direction and to said reference point to signals proportional to the rectangular coordinates thereof; first and second summing amplifiers coupled to said first and second co-ordinate conversion means to provide output signals respectively proportional to the X and Y components of the target's position with respect to said interceptor, where said X and Y components are respectively perpendicular and parallel to said reference direction; first and second synchro-resolvers each having a pair of ninety degree phase displaced stator windings and a rotor winding; circuit means coupling the rotor windings of said first and second synchro-resolvers respectively to the output circuits of said first and second summing amplifiers; a third summing amplifier; circuit means coupling one stator winding of each of said first and second synchro-resolvers to the input circuit of said third summing amplifier, a target range signal output terminal coupled to the output circuit of said third summing amplifier; a servo amplifier; circuit means coupling the other stator winding of each of said first and second synchro-resolvers to the input circuit of said servo amplifier; a motor tachometer-generator coupled to said servo amplifier to be driven thereby; means mechanically coupling the shaft of said tachometer-generator conjointly to the rotors of said first and second synchro-resolvers; circuit means feeding back the electrical output of said tachometer-generator to the input circuit of said servo amplifier to stabilize the operation thereof; a demodulator; circuit means coupling the electrical output of said tachometer-generator to the input circuit of said demodulator; a rate of change of bearing signal output terminal coupled to the output circuit of said demodulator; a differential gear; means mechanically coupling one input shaft of said differential gear to said tachometer-generator; and means positioning another input shaft of said differential gear in accordance with the interceptor heading whereby the output shaft of said differential gear is positioned in accordance with the difference between the target bearing and the interceptor heading.

2. A proportional navigation computer comprising: a target channel co-ordinate conversion system comprising, first and second input terminals having applied thereto direct voltages respectively proportional to the bearing and range of a target with respect to a reference direction and to a reference point, a unity gain D.C. amplifier having the input circuit thereof connected to said first input terminal, a modulator having the input circuit thereof connected to the output circuit of said D.C. amplifier, a servo amplifier coupled to said modulator to be energized thereby, a motor tachometer-generator coupled to be driven by said servo amplifier, circuit means feeding back the electrical output of said tachometer-generator to said servo amplifier to stabilize the operation thereof, a potentiometer having the wiper thereof positioned by the shaft of said tachometer-generator, circuit means connecting the wiper to the input circuit of said D.C. amplifier, electro-mechanical resolver means mechanically coupled to the shaft of said tachometer-generator, and means connected to said second input terminal and to said resolver means to apply to said resolver means a voltage proportional to said range; an interceptor channel co-ordinate conversion system comprising, third and fourth input terminals having applied thereto direct voltages respectively proportional to the bearing and range of an interceptor with respect to said reference direction and to said reference point, a unity gain D.C. amplifier having the input circuit thereof connected to said third input terminal, a modulator having the input circuit thereof coupled to the output circuit of said D.C. amplifier, a servo amplifier coupled to said modulator to be energized thereby, a motor tachometer-generator coupled to be driven by said servo amplifier, circuit means feeding back the electrical output of said tachometer-generator to said servo amplifier to stabilize the operation thereof, a potentiometer having the wiper thereof positioned by the shaft of said tachometer-generator, circuit means connecting the wiper to the input circuit of said D.C. amplifier, electro-mechanical resolver means mechanically coupled to the shaft of said tachometer-generator, and means connected to said fourth input terminal and to said resolver means to apply to said resolver means a voltage proportional to said range; first and second summing amplifiers coupled to said target channel resolver and to said interceptor channel resolver to provide output signals respectively proportional to the X and Y components of the target's position with respect to said interceptor, where said X and Y components are respectively perpendicular and parallel to said reference direction; first and second synchro-resolvers each having a pair of ninety degree phase displaced stator windings and a rotor winding; circuit means coupling the rotor windings of said first and second synchro-resolvers respectively to the output circuits of said first and second summing amplifiers; a third summing amplifier; circuit means coupling one stator winding of each of said first and second synchro-resolvers to the input circuit of said third summing amplifier; a target range signal output terminal coupled to the output circuit of said third summing amplifier; a servo amplifier; circuit means coupling the other stator winding of each of said first and second synchro-resolvers to the input circuit of said servo amplifier; a motor tachometer-generator coupled to said servo amplifier to be driven thereby; means mechanically coupling the shaft of said tachometer-generator conjointly to the rotors of said first and second synchro-resolvers; circuit means feeding back the electrical output of said tachometer-generator to the input circuit of said servo amplifier to stabilize the operation thereof; a demodulator; circuit means coupling the electrical output of said tachometer-generator to the input circuit of said demodulator; a rate of change of bearing signal output terminal coupled to the output circuit of said demodulator; a differential gear; means mechanically coupling one input shaft of said differential gear to said tachometer-generator; and means positioning another input shaft of said differential gear in accordance with the interceptor heading whereby the output shaft of said differential gear is positioned in accordance with the difference between the target bearing and the interceptor heading.

3. A proportional navigation computer comprising: a target channel co-ordinate conversion system comprising, first and second input terminals having applied thereto direct voltages respectively proportional to the bearing and range of a target with respect to a reference direction and to a reference point, a unity gain D.C. amplifier having the input circuit thereof connected to said first input terminal, a modulator having the input circuit thereof connected to the output circuit of said D.C. amplifier, a servo amplifier coupled to said modulator to be energized thereby, a motor tachometer-generator coupled to be driven by said servo amplifier, circuit means feeding back the electrical output of said tachometer-generator to said servo amplifier to stabilize the operation thereof, a potentiometer having the wiper thereof positioned by the shaft of said tachometer-generator, circuit means connecting the wiper to the input circuit of said D.C. amplifier, a synchro-resolver having the rotor thereof mechanically coupled to the shaft of said tachometer-generator, a modulator having the input circuit thereof coupled to said second input terminal, an amplifier having the input circuit thereof coupled to the output circuit of said modulator and the output circuit thereof coupled to the rotor windings of said synchro-resolver, a pair of output terminals, and means respectively coupling said stator windings to said output terminals; an interceptor channel co-ordinate conversion system comprising, third and fourth input terminals having applied thereto direct voltages respectively proportional to the bearing and range of an interceptor with respect to said reference direction and to said reference point, a unity gain D.C. amplifier having the input circuit thereof connected to said third input terminal, a modulator having the input circuit thereof coupled to the output circuit of said D.C. amplifier, a servo amplifier coupled to said modulator to be energized thereby, a motor tachometer-generator coupled to be driven by said servo amplifier, circuit means feeding back the electrical output of said tachometer-generator to said servo amplifier to stabilize the operation thereof, a potentiometer having the wiper thereof positioned by the shaft of said tachometer-generator, circuit means connecting the wiper to the input circuit of said D.C. amplifier, a synchro-resolver having the rotor thereof mechanically coupled to the shaft of said tachometer-generator, a modulator having the input circuit thereof coupled to said fourth input terminal, an amplifier having the input circuit thereof coupled to the output circuit of said modulator and the output circuit thereof coupled to the rotor windings of said synchro-resolver, a pair of output terminals, and means respectively coupling said stator windings to said output terminals; first and second summing amplifiers having the input circuits thereof coupled to said target channel and interceptor channel output terminals to provide output signals respectively proportional to the X and Y components of the target's position with respect to said interceptor, where said X and Y components are respectively perpendicular and parallel to said reference direction; first and second synchro-resolvers each having a pair of ninety degree phase displaced stator windings and a rotor winding; circuit means coupling the rotor windings of said first and second synchro-resolvers respectively to the output circuits of said first and second summing amplifiers; a third summing amplifier; circuit means coupling one stator winding of each of said first and second synchro-resolvers to the input circuit of said third summing amplifier; a target range signal output terminal coupled to the output circuit of said third summing amplifier; a servo amplifier; circuit means coupling the other stator winding of each of said first and second synchro-resolvers to the input circuit of said servo amplifier, a motor tachometer-generator coupled to said servo amplifier to be driven thereby; means mechanically coupling the shaft of said tachometer-generator conjointly to the rotors of said first and second synchro-resolvers; circuit means feeding back the electrical output of said tachometer-generator to the input circuit of said servo amplifier to stabilize the operation thereof; a demodulator; circuit means coupling the electrical output of said tachometer-generator to the input circuit of said demodulator; a rate of change of bearing signal output terminal coupled to the output circuit of said demodulator; a differential gear; means mechanically coupling one input shaft of said differential gear to said tachometer-generator; and means positioning another input shaft of said differential gear in accordance with the interceptor heading whereby the output shaft of said differential gear is positioned in accordance with the difference between the target bearing and the interceptor heading.

4. A proportional navigation computer comprising: first co-ordinate conversion means to convert signals proportional to the polar co-ordinates of a target with respect to a reference direction and a reference point to signals proportional to the rectangular co-ordinates thereof; second co-ordinate conversion means to convert signals proportional to the polar co-ordinates of an interceptor with respect to said reference direction and to said reference point to signals proportional to the rectangular co-ordinates thereof; first and second summing amplifiers coupled to said first and second co-ordinate conversion means to provide output signals respectively proportional to the X and Y components of the target's position with respect to said interceptor, where said X and Y components are respectively perpendicular and parallel to said reference direction; first and second sine-cosine potentiometers each having a pair of input terminals; circuit means connecting the output circuit of said first and second summing amplifiers respectively to one input terminal of each of said first and second sine-cosine potentiometers; circuit means including a unit gain D.C. amplifier respectively connecting the output circuits of said first and second summing amplifiers to the other input terminals of each of said first and second sine-cosine potentiometers; a third summing amplifier; circuit means connecting one wiper of each of said first and second sine-cosine potentiometers to the input circuit of said third summing amplifier; a target range signal output terminal coupled to the output circuit of said third summing amplifier; a modulator; circuit means including a unity gain amplifier connecting the other wiper of each of said first and second cosine potentiometers to the input circuit of said modulator; a servo amplifier; circuit means coupling the input circuit of said servo amplifier to the output circuit of said modulator; a motor tachometer-generator coupled to said servo amplifier to be driven thereby; means mechanically coupling the shaft of said tachometer-generator conjointly to the wipers of said first and second sine-cosine potentiometers; circuit means feeding back the electrical output of said tachometer-generator to the input circuit of said servo amplifier to stabilize the operation thereof; a demodulator; circuit means coupling the electrical output of said tachometer-generator to the input circuit of said demodulator; a rate of change of bearing signal output terminal coupled to the output circuit of said demodulator; a differential gear; means mechanically coupling one input shaft of said differential gear to said tachometer-generator; and means positioning another input shaft of said differential gear in accordance with the interceptor heading whereby the output shaft of said differential gear is positioned in accordance with the difference between the target bearing and the interceptor heading.

5. A proportional navigation computer comprising: a target channel co-ordinate conversion system comprising, first and second input terminals having applied thereto direct voltages respectively proportional to the bearing and range of a target with respect to a reference direction and to a reference point, a unit gain D.C. amplifier having the input circuit thereof connected to said first input terminal, a modulator having the input circuit thereof connected to the output circuit of said D.C. amplifier, a servo amplifier coupled to said modulator to be energized thereby, a motor tachometer-generator coupled to be driven by said servo amplifier, circuit means feeding back the electrical output of said tachometer-generator to said servo amplifier to stabilize the operation thereof, a potentiometer having the wiper thereof positioned by the shaft of said tachometer-generator, circuit means connecting the wiper to the input circuit of said D.C. amplifier, electro-mechanical resolver means mechanically coupled to the shaft of said tachometer-generator, and means connected to said second input terminal and to said resolver means to apply to said resolver means a voltage proportional to said range; an interceptor channel co-ordinate conversion system comprising, third and fourth input terminals having applied thereto direct voltages respectively proportional to the bearing and range of an interceptor with respect to said reference direction and to said reference point, a unity gain D.C. amplifier having the input circuit thereof connected to said third input terminal, a modulator having the input circuit thereof coupled to the output circuit of said D.C. amplifier, a servo amplifier coupled to said modulator to be energized thereby, a motor tachometer-generator coupled to be driven by said servo amplifier, circuit means feeding back the electrical output of said tachometer-generator to said servo amplifier to stabilize the operation thereof, a potentiometer having the wiper thereof positioned by the shaft of said tachometer-generator, circuit means connecting the wiper to the input circuit of said D.C. amplifier, electro-mechanical resolver means mechanically coupled to the shaft of said tachometer-generator, and means connected to said fourth input terminal and to said resolver means to apply to said resolver means a voltage proportional to said range; first and second summing amplifiers coupled to said target channel resolver and to said interceptor channel resolver to provide output signals respectively proportional to the X and Y components of the target's position with respect to said interceptor, where said X and Y components are respectively perpendicular and parallel to said reference direction; first and second sine-cosine potentiometers each having a pair of input terminals; circuit means connecting the output circuits of said first and second summing amplifiers respectively to one input terminal of each of said first and second sine-cosine potentiometers; circuit means including a unity gain D.C. amplifier respectively connecting the output circuits of said first and second summing amplifiers to the other input terminals of each of said first and second sine-cosine potentiometers; a third summing amplifier; circuit means connecting one wiper of each of said first and second sine-cosine potentiometers to the input circuit of said third summing amplifier; a target range signal output terminal coupled to the output circuit of said third summing amplifier; a modulator; circuit means including a unit gain amplifier connecting the other wiper of each of said first and second cosine potentiometers to the input circuit of said modulator; a servo amplifier; circuit means coupling the input circuit of said servo amplifier to the output circuit of said modulator; a motor tachometer-generator coupled to said servo amplifier to be driven thereby; means mechanically coupling the shaft of said tachometer-generator conjointly to the wipers of said first and second sine-cosine potentiometers; circuit means feeding back the electrical output of said tachometer-generator to the input circuit of said servo amplifier to stabilize the operation thereof; a demodulator; circuit means coupling the electrical output of said tachometer-generator to the input circuit of said demodulator; a rate of change of bearing signal output terminal coupled to the output circuit of said demodulator; a differential gear; means mechanically coupling one input shaft of said differential gear to said tachometer-generator; and means positioning another input shaft of said differential gear in accordance with the interceptor heading whereby the output shaft of said differential gear is positioned in accordance with the difference between the target bearing and the interceptor heading.

6. A proportional navigation computer comprising: a target channel co-ordinate conversion system comprising, first and second input terminals having applied thereto direct voltages respectively proportional to the bearing and range of a target with respect to a reference direction and to a reference point, a unity gain D.C. amplifier having the input circuit thereof connected to said first input terminal, a modulator having the input circuit thereof connected to the output circuit of said D.C. amplifier, a servo amplifier coupled to said modulator to be energized thereby, a motor tachometer-generator coupled to be driven by said servo amplifier, circuit means feeding back the electrical output of said tachometer-generator to said servo amplifier to stabilize the operation thereof, a potentiometer having the wiper thereof positioned by the shaft of said tachometer-generator, circuit means connecting the wiper to the input circuit of said D.C. amplifier, a sine-cosine potentiometer having a pair of input terminals and having the wipers thereof mechanically coupled to the shaft of said tachometer-generator, a first unity gain D.C. amplifier having the input circuit thereof connected to said second input terminal and the output circuit thereof connected to one of the input terminals of said sine-cosine potentiometer, a second unity gain D.C. amplifier having the input circuit thereof connected to the output circuit of said first D.C. amplifier and the output circuit thereof connected to the other input terminal of said sine-cosine potentiometer, a pair of conversion system output terminals, and circuit means connecting the wipers of said sine-cosine potentiometer respectively to said conversion system output terminals; an interceptor channel co-ordinate conversion system comprising, third and fourth input terminals having applied thereto direct voltages respectively proportional to the bearing and range of an interceptor with respect to said reference direction and to said reference point, a unity gain D.C. amplifier having the input circuit thereof connected to said third input terminal, a modulator having the input circuit thereof coupled to the output circuit of said D.C. amplifier, a servo amplifier coupled to said modulator to be energized thereby, a motor tachometer-generator coupled to be driven by said servo amplifier, circuit means feeding back the electrical output of said tachometer-generator to said servo amplifier to stabilize the operation thereof, a potentiometer having the wiper thereof positioned by the shaft of said tachometer-generator, circuit means connecting the wiper to the input circuit of said D.C. amplifier, a sine-cosine potentiometer having a pair of input terminals and having the wipers thereof mechanically coupled to the shaft of said tachometer-generator, a first unity gain D.C. amplifier having the input circuit thereof connected to said fourth input terminal and the output circuit thereof connected to one of the input terminals of said sine-cosine potentiometer, a second unity gain D.C. amplifier having the input circuit thereof connected to the output circuit of said first D.C. amplifier and the output circuit thereof connected to the other input terminal of said sine-cosine potentiometer, a pair of conversion system output terminals, and circuit means connecting the wipers of said sine-cosine potentiometer respectively to said conversion system output terminals; first and second summing amplifiers connected to said target channel and interceptor channel conversion system output terminals to provide output signals respectively proportional to the X and Y components of the target's position with respect to said interceptor, where said X and Y components are respectively perpendicular and parallel to said reference direction; first and second sine-cosine potentiometers each having a pair of input terminals; circuit means connecting the output circuits of said first and second summing amplifiers respectively to one input terminal of each of said first and second sine-cosine potentiometers; circuit means including a unity gain D.C. amplifier respectively connecting the output circuits of said first and second summing amplifiers to the other input terminals of each of said first and second sine-cosine potentiometers; a third summing amplifier; circuit means connecting one wiper of each of said first and second sine-cosine potentiometers to the input circuit of said third summing amplifier; a target range signal output terminal coupled to the output circuit of said third summing amplifier; a modulator; circuit means including a unity gain amplifier connecting the other wiper of each of said first and second cosine potentiometers to the input circuit of said modulator; a servo amplifier; circuit means coupling the input circuit of said servo amplifier to the output circuit of said modulator; a motor tachometer-generator coupled to said servo amplifier to be driven thereby; means mechanically coupling the shaft of said tachometer-generator conjointly to the wipers of said first and second sine-cosine potentiometers; circuit means feeding back the electrical output of said tachometer-generator to the input circuit of said servo amplifier to stabilize the operation thereof; a demodulator; circuit means coupling the electrical output of said tachometer-generator to the input circuit of said demodulator; a rate of change of bearing signal output terminal coupled to the output circuit of said demodulator; a differential gear; means mechanically coupling one input shaft of said differential gear to said tachometer-generator; and means positioning another input shaft of said differential gear in accordance with the interceptor heading whereby the output shaft of said differential gear is positioned in accordance with the difference between the target bearing and the interceptor heading.

References Cited in the file of this patent

UNITED STATES PATENTS

| | | |
|---|---|---|
| 2,404,387 | Lovell et al. | July 23, 1946 |
| 2,408,081 | Lovell et al. | Sept. 24, 1946 |
| 2,465,624 | Agins | Mar. 9, 1949 |
| 2,560,527 | Dehmel | July 10, 1951 |
| 2,762,562 | Biderman | Sept. 11, 1956 |

FOREIGN PATENTS

| | | |
|---|---|---|
| 746,732 | Great Britain | Mar. 21, 1956 |

OTHER REFERENCES

"Electronic Analog Computers," Korn and Korn, published by McGraw-Hill (New York), 1956, copy in Scientific Library, pages 93, 336–37, 404–406, and sec. 1.3.

"Electronic Instruments" (Greenwood et al.), published by McGraw-Hill (New York), 1948, pages 74 and 75 relied on.

"Servo Mechanisms and Regulating System Design" (Chestnut and Mayer), published by Wiley & Sons, Inc. (New York), 1951, pages 359 and 480 relied on.

Electrical Manufacturing, "Electrical Resolvers" (S. Davis), March 1953, pages 128–133 relied on.

"Electronic Analog Computers" (Korn & Korn), published by McGraw-Hill (New York), 1952, pages 30, 235 and 282–285 relied on.